A. F. JENKINS.
ACETYLENE GENERATOR.
APPLICATION FILED AUG. 7, 1912.
1,096,246.
Patented May 12, 1914.
3 SHEETS—SHEET 1.
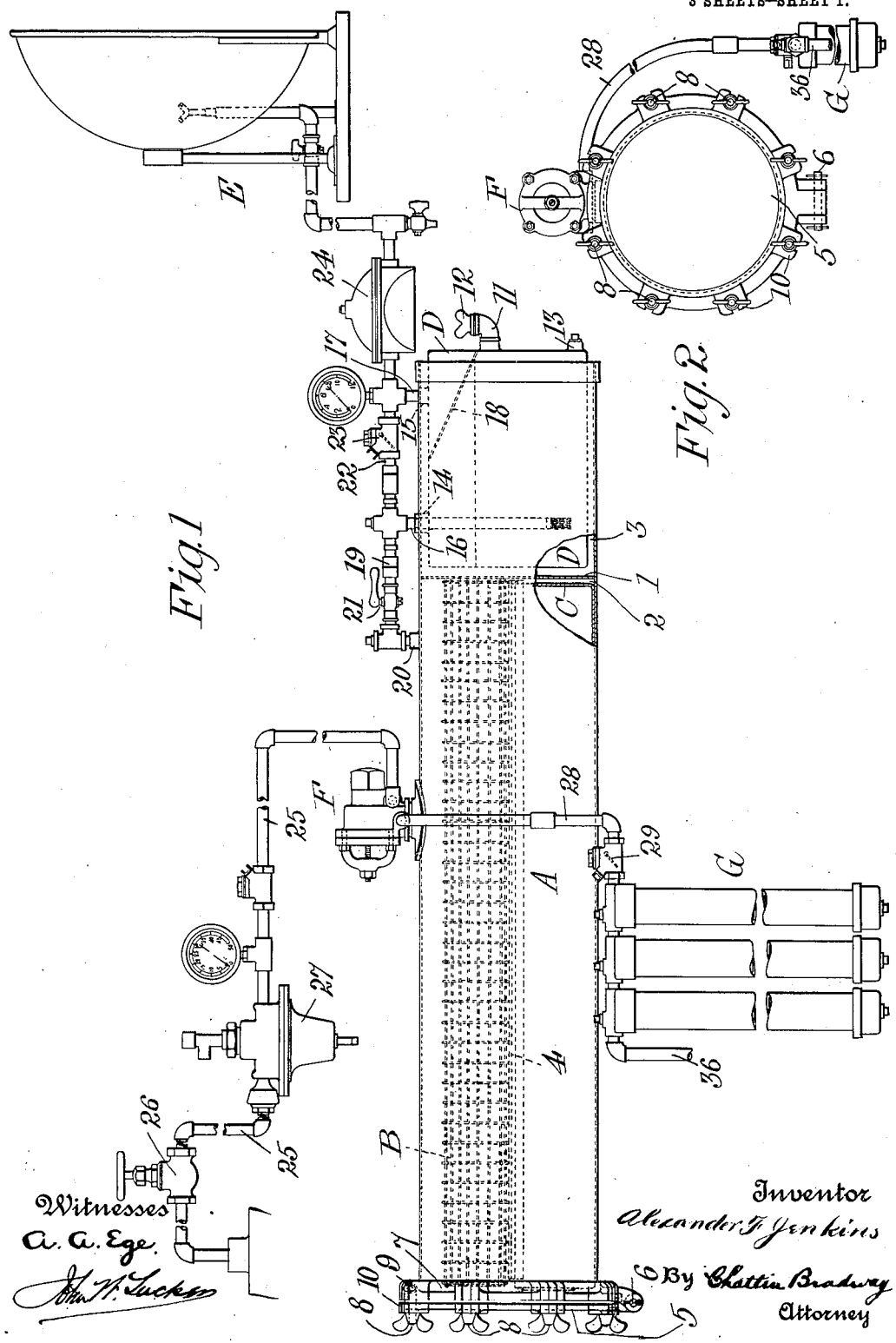

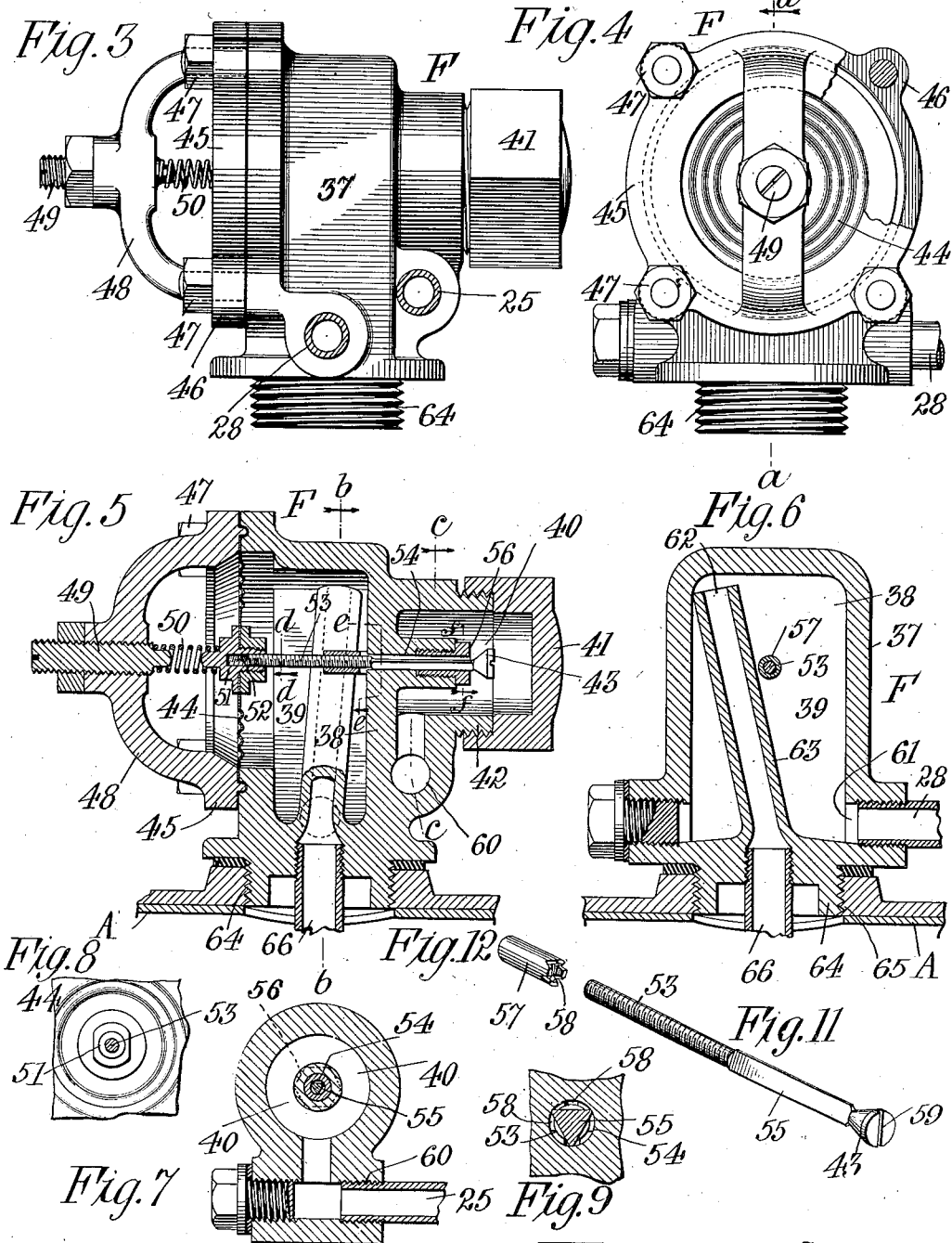

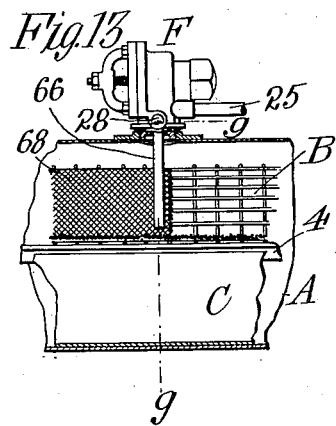
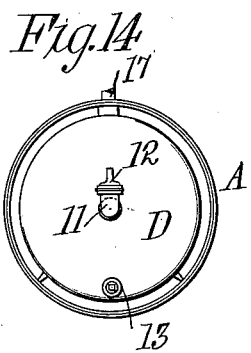
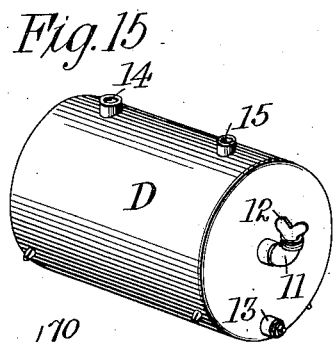
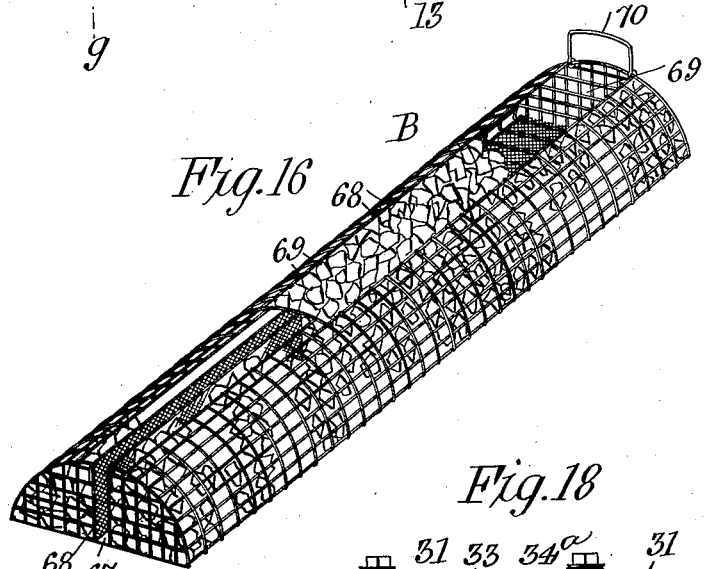
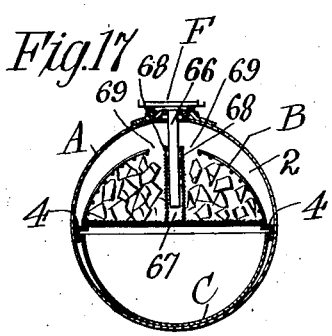
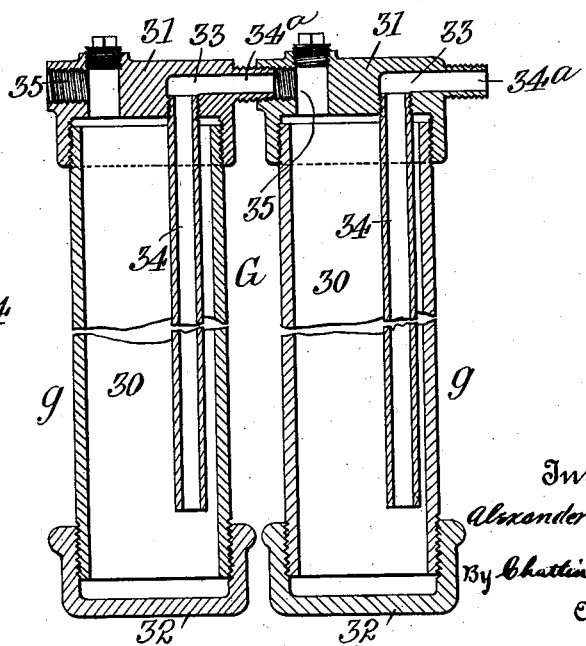

UNITED STATES PATENT OFFICE.

ALEXANDER F. JENKINS, OF BALTIMORE, MARYLAND.

ACETYLENE-GENERATOR.

1,096,246.  Specification of Letters Patent.  Patented May 12, 1914.

Application filed August 7, 1912. Serial No. 713,819.

*To all whom it may concern:*

Be it known that I, ALEXANDER F. JENKINS, a subject of the King of Great Britain, residing at Baltimore city, State of Maryland, have invented certain new and useful Improvements in Acetylene-Generators, of which the following is a specification.

This invention relates to acetylene generators of that type in which the gas is generated by the action of steam on the carbid.

The present invention has for its general objects to improve the valve for admitting the steam to the generator and also to separate water of condensation from the steam, so that better regulation of the generation of gas is rendered possible; to improve the washer through which the gas passes from the generator to the service pipe, and to improve the receptacle for holding the carbid, and also to improve the manner in which the steam is admitted to the carbid.

Furthermore, the invention has for its object to provide an effective means for draining off the water of condensation, and to afford a blow-off or pressure relief for the generator.

Another object is the provision of means for preventing water from being siphoned back from the washer into the generator whereby an excessive generation of gas would result.

With such general objects in view and others, as will appear as the description proceeds, the invention comprises the various novel features of construction and arrangement of parts which will be more fully described hereinafter and set forth with particularity in the claims appended hereto.

In the accompanying drawings, which illustrate one embodiment of the invention, Figure 1 is a side elevation of a complete apparatus for headlight installation, portions being broken away in order to condense the figure. Fig. 2 is an end view of the generator showing in connection therewith the condensation draining and pressure relief device. Fig. 3 is a side elevation of the constant pressure steam admitting valve. Fig. 4 is an end elevation thereof with a portion broken away. Fig. 5 is a vertical section on line *a—a*, Fig. 4. Figs. 6 and 7 are sectional views of the valve device on lines *b—b* and *c—c*, Fig. 5. Figs. 8, 9 and 10 are detail sectional views on lines *d—d*, *e—e* and *f—f*, respectively, Fig. 5. Fig. 11 is a perspective view of the valve stem. Fig. 12 is a perspective view of the sleeve on the valve stem. Fig. 13 is a detail sectional view of the generator showing the relation of the steam pipe to the carbid holder. Fig. 14 is a view of the washer end of the generator. Fig. 15 is a perspective view of the washer removed. Fig. 16 is a perspective view of the carbid holder or basket. Fig. 17 is a sectional view on line *g—g*, Fig. 13. Fig. 18 is an enlarged sectional view, partly broken away, of the condensation draining and pressure relief device for the generator.

Similar reference characters are employed to designate corresponding parts throughout the views.

While Fig. 1 shows the generator in connection with a headlight such as is used on locomotives, it is to be understood that the generator is susceptible of use in a variety of combinations. For instance, the generator may be used in lighting systems for buildings, passenger coaches, vessels, automobiles and the like, or torchlight systems for steam dredges, shovels and the like, or in oxyacetylene welding systems.

The generator A is in the present instance shown as a horizontal cylinder that is divided by a partition 1 adjacent one end into a gas generating compartment 2 and a washer compartment 3, as clearly shown in Fig. 1. Extending longitudinally of the generating compartment 2 are angle irons 4, Figs. 1, 13 and 17, which form ledges for supporting the carbid holder or basket B, there being under the basket a pan C which is adapted to receive the powder resulting from the reaction of the steam on the carbid. The basket B and pan C are insertible into and removable from the generator through the left end, Fig. 1, which has a cover plate or door 5, that is hinged at 6 to a ring 7 fastened to the end of the generator, the door being gastight by means of clamping bolts 8, which are hinged at 9 on the ring 7 and engage in slotted lugs 10 on the cover 5.

The washer D, Figs. 1, 14 and 15, is a drum or cylinder that occupies the chamber 3, the diameter of the chamber being such that an air jacket or space is provided all around it so that the washer will be kept comparatively cool. The washer containing chamber 3 is open at the right end, Fig. 1, and the washer may protrude therefrom, as shown. The washer D has a filling means, such as a mouth 11 located on the outer head, such mouth being normally closed by a plug or equivalent means 12. The filling means for the washer is located a few inches below the top thereof so that when the washer is filled by pouring water into the mouth, there will always be a considerable space for gas in the top of the washer. At the bottom of the washer is a normally plugged or closed discharge spout or outlet 13. At the top of the washer are openings 14 and 15 to which are connected, respectively, the gas inlet pipe 16 and the outlet pipe 17. The inlet pipe 16 extends close to the bottom of the washer so that the gas will be compelled to ascend through the water and be cleansed of impurities thereby. The pipe 17 communicates with the gas space of the washer and the gas, in passing into the pipe 17, traverses a screen or equivalent means 18 which serves to arrest particles of moisture or impurities. The pipe 16 is connected by a suitable conduit 19 with the top of the gas generating chamber 2, at 20, and in this conduit 19 is a cut-off valve 21. Between the pipes 16 and 17 is a connection 22 that contains a check valve 23, which opens toward 16 and closes toward 17, and as a consequence the gas, in passing from the generator, must traverse the washer D, but this valve provides for equalization of pressure in the washer and generator, so that when the pressure should lower in the generator, as by steam condensing therein, it is impossible for water to be drawn back from the washer through the pipes 16 and 19. In the service pipe 17 is a pressure regulator 24 of ordinary construction, and through this the gas passes to the headlight E or any other consumption device or system.

The source of steam may be of any suitable character, and the steam is supplied through the pipe 25, which has a cut-off valve 26 and a pressure regulator 27. The pipe 25 connects with a valve device F on the generator which operates automatically to maintain a supply of steam to the generator in such volume that the resulting gas will be of approximately uniform pressure. The detail construction of the valve device F will be presently disclosed, but in passing, it is to be remarked that the valve device serves as a steam separator whereby the water of condensation will be prevented from entering the generator. This water of condensation is drained from the valve device F, Figs. 1 and 2, through a pipe 28 which contains a check valve 29 at its lower end and connects with a condensation drain and blow-off device G.

By reference to Fig. 18, the interior of the device G will be understood. The said device is made in a plurality of sections according to the pressure of the gas to be generated, as by multiplying the sections the device offers greater resistance to the relief of pressure. Each section $g$ comprises a length of pipe 30 that has upper and lower heads 31 and 32 applied thereto. The upper head is a casting that has an inlet 33 to which is connected a tube or pipe 34, which extends downwardly to a point adjacent the bottom of the pipe 30. The upper head 31 has also an outlet 35 to which the nipple $34^a$ of an adjacent section is connected. By reason of this construction, a serpentine passage of any desired length may be obtained through which the water of condensation can readily flow, but gas cannot escape without overcoming the combined resistance of the water in the vertical pipes 34. The outlet of the last section may be connected with a suitable drain pipe 36, Fig. 1, leading to a suitable point of discharge.

Referring now to Figs. 3 to 12, inclusive, the construction and operation of the steam admission valve device will be described. 37 designates the body of the valve device which contains a partition 38 which divides the body into a separating or condensing chamber 39 and an inlet chamber 40, one side of the latter chamber being formed by a removable cap nut 41 which screws on the flange 42, the said nut serving to permit access to the valve 43 for adjustment or other purposes. The separating chamber 39 has the side opposite from the partition 38 open and across this open side extends a metallic or other diaphragm 44, which is held in place by a clamping ring 45 secured to the body 37 by threaded studs on such body passing through apertured ears 46 on the ring, and on which studs are nuts 47. The clamping ring 45 has a yoke 48 which carries a centrally disposed adjusting screw 49, between which and the diaphragm is interposed a spring 50 which is adjusted as to tension by the screw 49. The diaphragm 44 carries a central body 51 which has a tapped bore 52 into which screws the threaded portion 53 of the stem of the valve 43. This stem extends through a passage 54 in the partition 38, and the portion 55 of this stem which extends through the passage 54 is angular in cross-section so that steam can readily flow from the inlet chamber 40 to the condensation chamber 39. At the inlet passage 54 is a valve seat 56 with which the valve 43 is adapted to engage when the supply of steam is interrupted by the pressure of the steam in the chamber 39 being of such tension as to overcome the power of the spring 50. In order to limit the opening movement of the valve 43, there is provided on the threaded portion 53 of the stem a sleeve 57 which is adapted to engage the partition 38 at the end of the passage 54, said sleeve having notches or ports 58 so as not to interrupt the flow of steam. The valve 43 has a slot 59 for receiving a screw driver whereby the valve can be adjusted with respect to its seat and the diaphragm.

The steam supply pipe 25 is connected with the inlet chamber 40 of the valve device F through a cored-out passage 60, Figs. 3 and 7, and the drainage pipe 28 connects with the condensation chamber 39 through an opening 61, as shown in Fig. 6. In order to separate the water of condensation from the steam that is supplied to the generator, the chamber 39 has a steam outlet 62 adjacent its top, while the drainage outlet 61 is near the bottom. The steam outlet 62 is in the form of a tube 63 extending from the bottom of the chamber 39 toward the top thereof, and is shown integral with the bottom of the body 37. This tube 63 is inclined to one side of a central longitudinal plane so as to permit the stem of the valve to be centrally disposed. The steam, in entering the chamber 39 from the passage 54, is required to change its course in reaching the steam outlet 62, and consequently any particles of moisture are separated from the steam and flow out through the condensation drainage device. The bottom portion of the body 37 has a threaded coupling portion 64 which screws into an opening 65 in the generator A, and the short section of straight pipe 66 is attached to the body 37 in communication with the steam outlet passage 62. This pipe 66 extends downwardly into the generator so as to deliver steam thereto.

It is desirable to admit steam close to the bottom of the mass of carbid in the generator, and hence the steam pipe 66 extends into the basket B and terminates close to the bottom thereof, as clearly shown in Figs. 13 and 17. Since the pipe 66 extends into the basket, it is necessary to so construct the basket that it can be readily removed, and for this purpose a longitudinal passage 67 extends into the basket from one end. This passage is formed by spaced parallel vertically disposed strips of wire mesh 68 that extend from one end of the basket inwardly to a suitable point. The body of the basket is formed of wire netting of suitable gage and is closed at its ends and provided with a filling opening 69 at its top whereby the carbid can be placed in the basket, said filling opening extending the full length of the basket. To facilitate the removal of the basket, the outer end thereof is provided with a handle 70.

In operation, the supply of steam is opened after the generator has been charged with carbid, and steam flows through the valve device F into the generator, the water of condensation being separated and drained off through the device G. The steam is discharged downwardly into the generator through the pipe 66 and acts on the bottom of the mass of carbid in the production of the gas. In this manner, the powder resulting from the reaction drops through the bottom of the basket into the collecting pan C. The pressure produced in the generator acts on the diaphragm of the controlling valve and regulates the latter so that only so much steam will be admitted as will generate gas in accordance with the demand therefor. The gas passes from the generator through the washer, where it is purified and thence flows to the headlight or other consumption device. The generation of gas will go on continuously without any attention on the part of an attendant as long as gas is being consumed and the pressure of the gas will be automatically maintained substantially constant. By properly adjusting the tension on the diaphragm of the valve device F, and by accordingly varying the sections of the blow-off device G, any desired pressure of gas may be obtained. The apparatus requires a minimum of attention merely in re-charging the basket, emptying the residue and renewing the water in the washer from time to time.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described the invention, what I claim as new, is:—

1. The combination of a generator, with a unitary device mounted thereon to admit dry steam to the carbid, said device comprising a chambered body, means therein for draining off water of condensation, means for conveying steam from the chamber to the generator, and an element responsive to the pressure of the generated gas for controlling the amount of steam admitted to the generator.

2. The combination of a generator having means for holding carbid, and a valve device mounted on the generator for automatically controlling the pressure of the generated gas by varying the supply of steam in accordance with the demand for gas, said device being chambered and including means for separating water of condensation from the steam.

3. The combination of a generator including means for holding carbid, a device responsive to the pressure of the generated gas for supplying steam to the generator, said device containing a chamber for separating water of condensation from the steam before it enters the generator, and a combined blow-off and condensation drain connected with the device.

4. The combination of a generator including means for holding carbid, a chambered device for controlling the supply of steam thereto including a valve and a diaphragm connected therewith to open and close the valve according to the variations of the pressure of the gas in the generator, and a conduit leading from the top of the chamber in the said device to the carbid holding means.

5. The combination of a generator including means for holding carbid, a chambered device carried by and mounted on the outside of the generator and including means for supplying steam to the generator and also including means for separating water of condensation from the steam before the latter enters the generator, and means for draining off the water of condensation and for forming a pressure relief for the generator.

6. The combination of a generator including means for holding carbid, a steam supply conduit connected with the generator, a chambered device on the generator for separating water of condensation from the steam before it enters the generator, and a condensation drainage and pressure relief device connected with the said chamber of the device.

7. The combination of a generator including means for holding carbid, a steam supply conduit, a valve device on the top of the generator for controlling the pressure of steam supplied to the generator from the conduit and including means for separating the water of condensation from the steam, said valve device being adjustable for the generation of gas at any desired pressure, and a drainage device for the water of condensation, said device being made in sections detachably united for constituting an adjustable pressure relief for the generator.

8. The combination of an acetylene generator containing carbid, with a device for admitting steam thereto for acting on the carbid, said device comprising an inlet chamber, a condensation chamber, and a pressure-actuated valve controlling communication between the chambers, said condensation chamber having means for admitting steam to the acetylene generator.

9. The combination of an acetylene generator containing carbid, with a device for admitting steam thereto for acting on the carbid, said device comprising a casing having an inlet chamber, a condensation chamber, a valve controlling communication between the chambers, a diaphragm in the condensation chamber responsive to the pressure of gas in the generator, means for adjusting the tension of the diaphragm, and means for draining the condensation chamber and for serving as a pressure relief for the generator.

10. The combination of an acetylene generator including means for holding carbid, with a valve device for supplying steam to the generator, said device comprising a body having an inlet chamber, a condensation chamber communicating therewith, a diaphragm forming one wall of the condensation chamber, a valve adjustably connected with the diaphragm for controlling communication between the chambers, and means for supplying steam from the condensation chamber to the generator.

11. The combination of an acetylene generator containing carbid, and a device for supplying steam thereto, said device comprising a body having a chamber connected with the source of steam supply, and a chamber connected with the generator, there being a passage between the chambers, a valve for controlling the passage, a diaphragm in the second chamber responsive to the pressure of gas in the generator, a valve controlling the said passage and having a stem adjustably connected with the diaphragm and provided with an adjustable stop for limiting the opening movement of the valve, and means for adjusting the tension of the diaphragm.

In testimony whereof I affix my signature in presence of two witnesses.

ALEXANDER F. JENKINS.

Witnesses:
C. N. POLLARD,
A. THOMPSON.